United States Patent [19]

Oudshoorn et al.

[11] Patent Number: 4,739,313

[45] Date of Patent: Apr. 19, 1988

[54] MULTILEVEL GREY SCALE OR COMPOSITE VIDEO TO RGBI DECODER

[75] Inventors: Mark Oudshoorn, Wheeling; Al Stankus, Melrose Park, both of Ill.; Clyde Smith, Melville, N.Y.

[73] Assignee: Rich, Inc., Franklin Park, Ill.

[21] Appl. No.: 874,285

[22] Filed: Jun. 13, 1986

[51] Int. Cl.[4] .................... G06F 3/14

[52] U.S. Cl. .................... 340/703; 340/793

[58] Field of Search .................... 340/703, 793; 358/81, 358/82, 13

[56] References Cited

U.S. PATENT DOCUMENTS

| | | | |
|---|---|---|---|
| 2,920,131 | 1/1960 | Valensi | 358/13 |
| 3,603,962 | 9/1971 | Lechner | 340/703 |
| 3,710,011 | 1/1973 | Altemus et al. | 358/82 |
| 4,415,922 | 11/1983 | Reymond et al. | 358/81 |
| 4,462,042 | 7/1984 | Reymond et al. | 358/81 |

FOREIGN PATENT DOCUMENTS

| | | | |
|---|---|---|---|
| 66332 | 1/1977 | Japan | 340/703 |
| 33422 | 3/1977 | Japan | 358/13 |

OTHER PUBLICATIONS

IBM Technical Disclosure Bulletin, vol. 28, No. 3, Aug. 1985, pp. 1217-1221.

*Primary Examiner*—John W. Shepperd
*Attorney, Agent, or Firm*—Stiefel, Gross & Kurland

[57] ABSTRACT

A decoder apparatus (200) provides an R,G,B,I video drive signal in a TTL type of format from a received composite video input signal which comprises sync information and displayable information, such as conventional black and white video or a digitally encoded color video signal comprising a sixteen level code for providing sixteen possible color combinations of R,G,B, and I, without loss of bandwidth. The decoder (200) includes means for receiving the composite video input signal (202,10) and restoring it into separate DC restored sync (20*a*, 20*b*) and black and white or color video display information (30, 40, 50), both of which may be displayed on the same RGB monitor (107). White reference level signals are dynamically provided from the sampled video information and are used by a flash converter (100) in converting grey scale digitally encoded color video information into the TTL format R,G,B,I type of video signal (60, 70, 80*a*, 80*b*, 82*a*, 82*b*, 82*c*) which recovers the origianl R,G,B,I color signal. A fixed white reference level signal (84, 82) is used in place of the dynamically sampled white reference level signal when the detected composite video signal is black and white. In the instance of black and white, a pair of bits, through mapping, are used to determine the make-up of the TTL format based on the fixed reference signal, with the MSB representing the half point in the analog domain for the reference signal and the NSB representing the quarter point. Thus, a code of 1-1 represents full intensity white, 1-0 represents grey, 0-1 represents low intensity white, and 0-0 represents black.

27 Claims, 4 Drawing Sheets

MULTILEVEL GREY SCALE OR COMPOSITE VIDEO TO RGBI DECODER

CROSS-REFERENCE TO RELATED APPLICATIONS

This application is related to the commonly owned, contemporaneously filed patent application entitled "Color Encoder Apparatus" naming Mark Oudshoorn and Al Stankus as joint inventors thereof, the contents of which are specifically incorporated by reference herein in their entirety.

TECHNICAL FIELD

The present invention relates to color decoder apparatus and particularly to a color decoder capable of providing an R,G,B,I TTL type of video drive signal from a grey scale encoded composite video signal, such as one transmitted over a single coaxial cable, irrespective of whether the signal is a conventional black and white or digitally encoded color video signal. In the instance of reception of a digitally encoded color video signal over the cable, a dynamically sampled white reference signal derived from the received video information is employed in the conversion process, with this signal being replaced by a fixed white reference signal in the instance of reception of a conventional black and white video signal over the cable.

BACKGROUND ART

Systems which convert between color video signals and grey scale video signals are known in the art, as are systems employing digitally encoded video information, such as disclosed, by way of example, in U.S. Pat. Nos. 4,233,601; 4,345,276; 4,437,093; 4,373,156; 4,232,311; 4,368,484; 4,481,509; 4,481,594; 4,425,581 and 4,270,125. However, none of these prior art systems known to applicants is readily capable of use in systems where it is desired to inexpensively transmit color video information great distances over single coaxial cables to RGB type of monitors such as normally employed with computer displays, such as an IBM PC. Moreover, no such systems are known to applicants which also readily permit received conventional black and white video information to be displayed on the same RGB monitor as received digitally encoded color video information. Furthermore, in this regard, applicants are not aware of any prior art color decoders or systems which employ a 16 level grey scale code, i.e. 16 levels of grey to encode the video signal into 16 possible R,G,B,I color combinations, to provide the four R,G,B,I color bits over a single coaxial cable with no loss of bandwidth in an efficient and cost effective manner. These disadvantages of the prior art are overcome by the present invention.

DISCLOSURE OF THE INVENTION

The present invention relates to a decoder for providing an R,G,B,I TTL type of video drive signal from a grey scale encoded composite video input signal comprising sync information and digitally encoded displayable information, in which the TTL format R,G,B,I type of video signal may be provided from the grey scale encoded composite video signal, such as one comprising a code comprising sixteen levels or shades of grey for providing sixteen possible color combinations of R,G,B, and I, without loss of bandwidth. The decoder may also provide an R,G,B,I TTL type of video drive signal from a conventional type of black and white video signal. The decoder includes means for receiving the grey scale digitally encoded color video input signal and restoring it into separate DC restored sync and grey scale encoded color video display information. In the case of a digitally encoded color video signal input, white reference level signals are dynamically provided from the sampled video information and are used in converting the grey scale digitally encoded color video information to the TTL format R,G,B,I type of video signal. Thus, the decoder converts the multilevel grey scale digitally encoded color video signal into a TTL format type of R,G,B,I video drive signal by mapping the grey scale digitally encoded color video signal based on the reference level signal. In this manner, a multilevel grey scale digitally encoded color video signal may be decoded to provide a TTL format R,G,B,I type of video drive signal without loss of bandwidth.

In the instance when the received video signal is a conventional black and white signal, then a fixed white reference level signal is used in the conversion process in place of the dynamically sampled white reference signal level. In this instance, the two most significant bits of a four bit grey scale encoded signal are used to determine the make-up of the TTL format for the resultant RGB type of video drive signal since the two least significant bits provide too fine of a resolution to have an impact on the coarse mapping used, with the most significant bit representing the half point in the analog domain, for the reference signal and the next significant bit representing the quarter point in the analog domain for the reference signal. In defining the TTL format for the R,G,B,I type of video drive signal, four levels are preferably employed, full intensity white, which occurs when the encoded pair of bits represents 75% of the reference signal level or a 1-1 code, grey which results when the encoded pair of bits represents a signal level within 50%–75% of the reference signal level or a code of 1-0, low intensity white, which is a different shade of grey, which results when the encoded pair of bits represents a signal level within 25%–50% of the reference signal level or a code of 0-1 and black, representing no R,G,B, which occurs when the encoded pair of bits represents a signal level within 0%–25% of the reference signal level or a code of 0-0. Thus, the decoder converts the conventional black and white video signal input into a TTL format type of R,G,B,I video drive signal by mapping the received reference level signal to bits representing the four previously defined intensity levels. In this manner, a conventional black and white video signal may be decoded to provide a TTL format R,G,B,I type of video drive signal without loss of bandwidth, with the conventional black and white video signal thus being displayable on the same RGB monitor as the aforementioned digitally encoded color video signal.

BEST MODE FOR CARRYING OUT THE INVENTION

Figure 1:
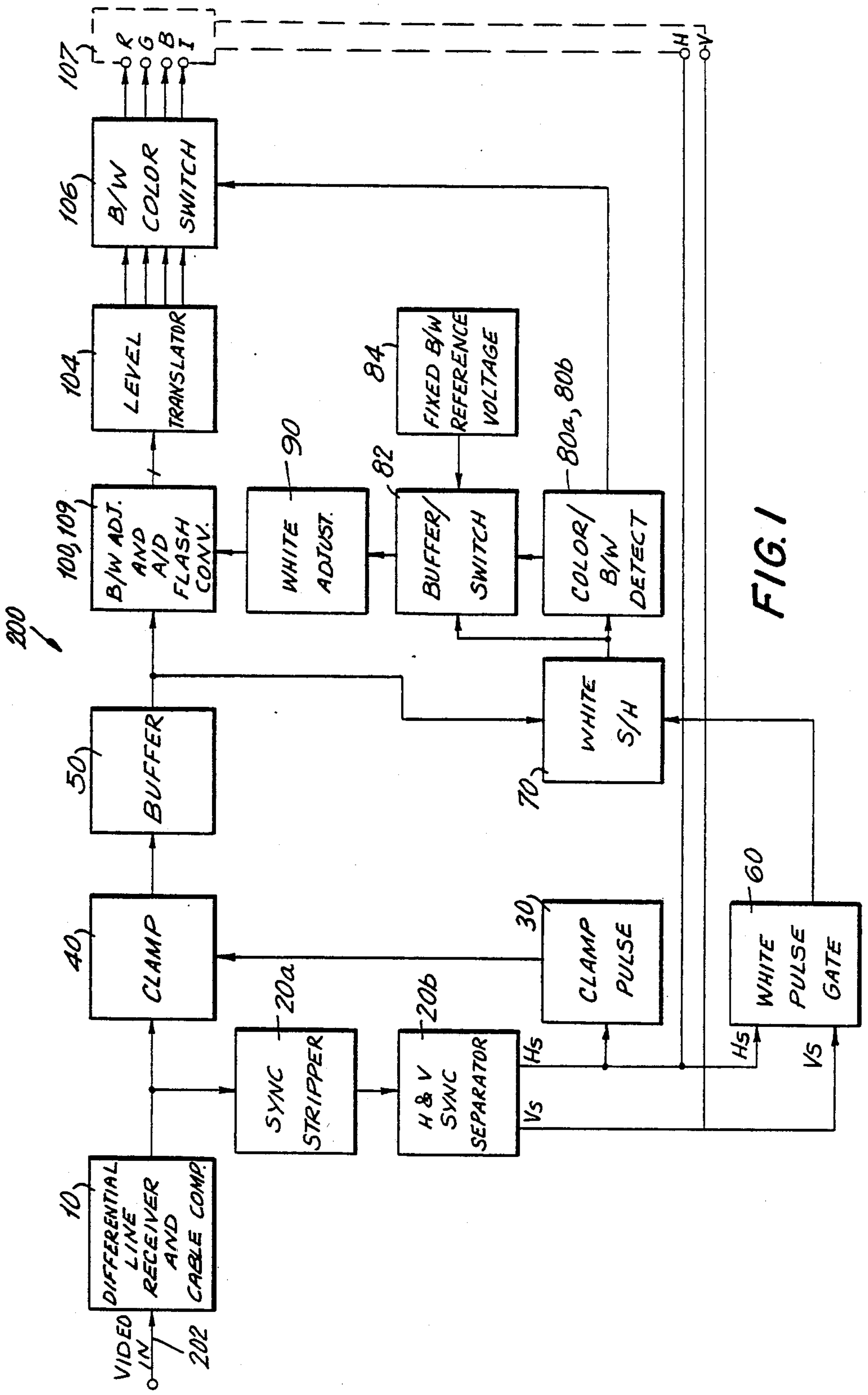
FIG. 1 is a functional block diagram of the presently preferred embodiment of a color decoder apparatus in accordance with the present invention.

Referring now to the drawings in detail, and initially to FIG. 1 thereof, a functional block diagram of the presently preferred embodiment of a color decoder, generally referred to by the reference numeral 200, in accordance with the present invention is shown. In accordance with the present invention, the preferred color decoder 200 is capable of receiving standard digitally encoded composite video signals, containing either digitally encoded color or conventional black and white video information, transmitted over a single conventional coaxial cable, and converting these signals into a TTL type of format such as for use with a conventional RGB monitor so as to provide a display on the RGB monitor 107 irrespective of whether the input video information contained in the received signal was color or black and white. As will be explained in greater detail hereinafter, the decoder 200 of the present invention requires only a single coaxial cable for reception of the digitally encoded color or conventional black and white signals which it receives and decodes for provision to a conventional RGB monitor 107 for display thereon. In those instances when only a single coaxial cable is desired or available, such as at installations employed at brokerage houses or stock exchanges using RGB monitors, the savings realized by the present invention can become significant such as through the elimination of cross point switching at a video switch.

As explained in the commonly owned copending U.S. Patent application entitled "Color Encoder", contemporaneously filed herewith, the contents of which are specifically incorporated by reference herein in their entirety, the transmitted digitally color video signal, such as provided by the encoder described therein, preferably is a digital signal which contains the video information in a code comprising sixteen levels of grey, termed a grey scale code herein, which is used to transmit four RGB color bits, and with a seventeenth level or additional bit representing sync information. It is this transmitted color digitally encoded input signal, or conventional black and white video signal, which the presently preferred color decoder 200 of the present invention receives over the single coaxial cable 202 and, in accordance with the present invention, decodes into the four color bits, R,G,B and I, required to drive the conventional RGB monitor 107. Thus, sixteen shades or levels of gray are preferably used to transmit the four RGB color bits, effectively enabling the required TTL format type of information required for an RGB monitor 107 to be transmitted over great distances over a single coaxial cable 202 without the need for cross point switching, as will be explained in greate detail hereinafter.

As shown and preferred in FIG. 1, the conventional black and white or color grey scale digitally encoded color video signal which is received by the decoder 200 via coaxial cable 202 is provided to a differential line receiver and cable compensation and equalization network 10, shown in greater detail in the schematic of FIG. 2, which DC restores the received video signal and preferably makes the frequency response of the cable flat. The output of this differential line receiver and cable compensation and equalization network 10 is preferably fed to a conventional sync stripper 20*a* to be described in greater detail hereinafter with reference to FIG. 2, which is preferably clamped to do DC restoration, and thereafter to a conventional horizontal and vertical sync separator 20*b* to provide the vertical, Vs, and Hs, horizontal, sync signals. As will be explained with reference to FIG. 2, the sync stripper 20*a* and the sync separator 20*b* preferably comprise a conventional type of adaptive sync stripper 20*a*, 20*b*, with the derived horizontal sync or Hs signal preferably being used to create a clamp pulse, via a differentiator network 30, as well as to drive a white pulse gate 60, to be described in greater detail hereinafter, and to provide the horizontal sync input to the RGB monitor 107. The derived vertical sync or Vs signal is also fed to the white pulse gate 60 and provides the vertical sync input to the RGB monitor 107. As will be explained in greater detail hereinafter with reference to FIG. 2, Vs is slightly offset from Hs, such as by about 10 μsec. due to integrator function, which factor is preferably used in the decoder 200 of the present invention to locate the full scale sample which is preferably found at the next Hs or next line after the falling edge of Vs is detected.

The clamp pulse which is derived from Hs via differentiator 30 is preferably fed to a clamp network 40 which provides DC restoration of the video signal to be recovered from the received composite video signal provided to network 40 from network 10.

Figure 2A:
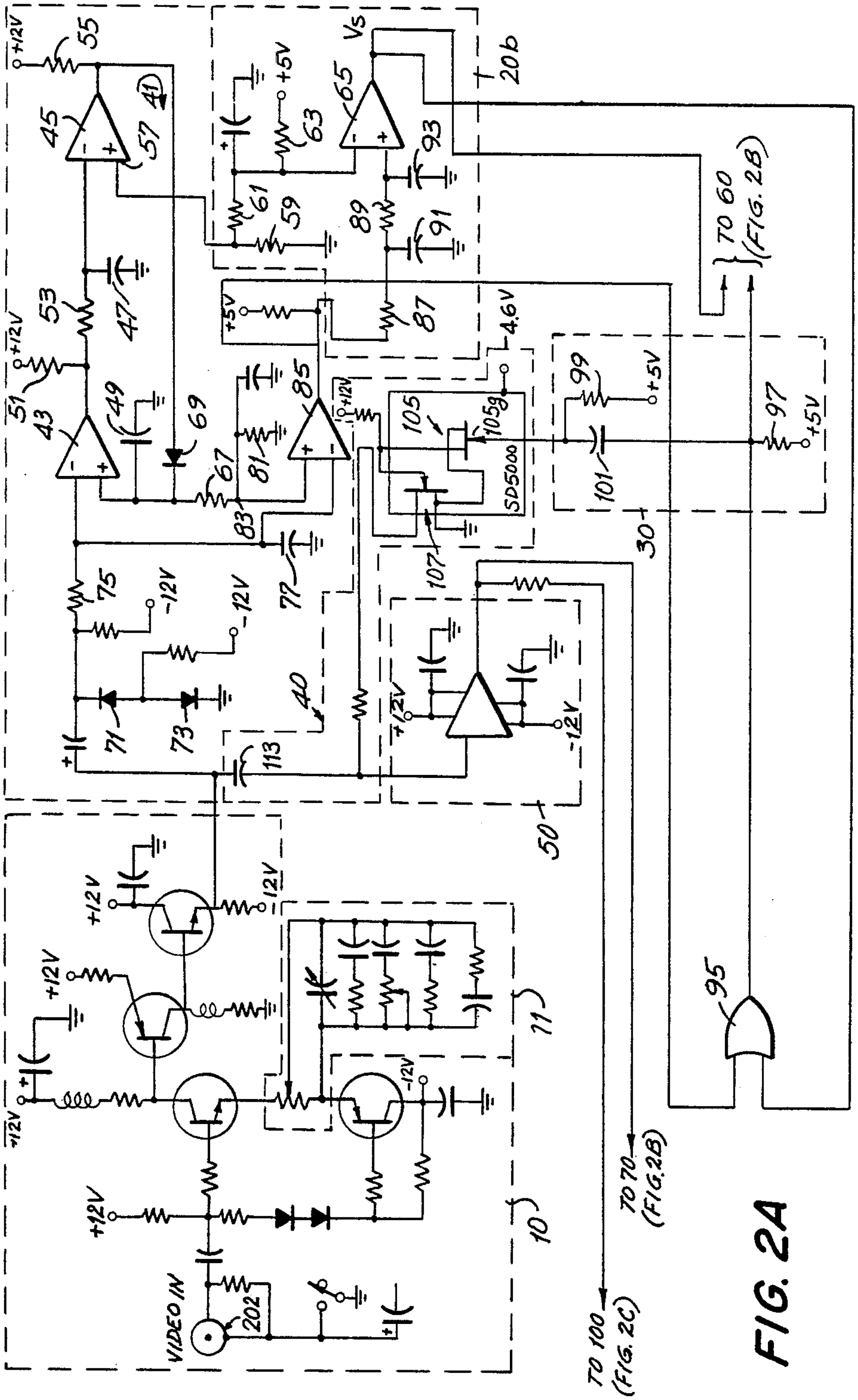
FIG. 2, which comprises FIGS. 2A–2C taken together, is a logic schematic diagram corresponding to the functional block diagram of FIG. 1.
Figure 2B:
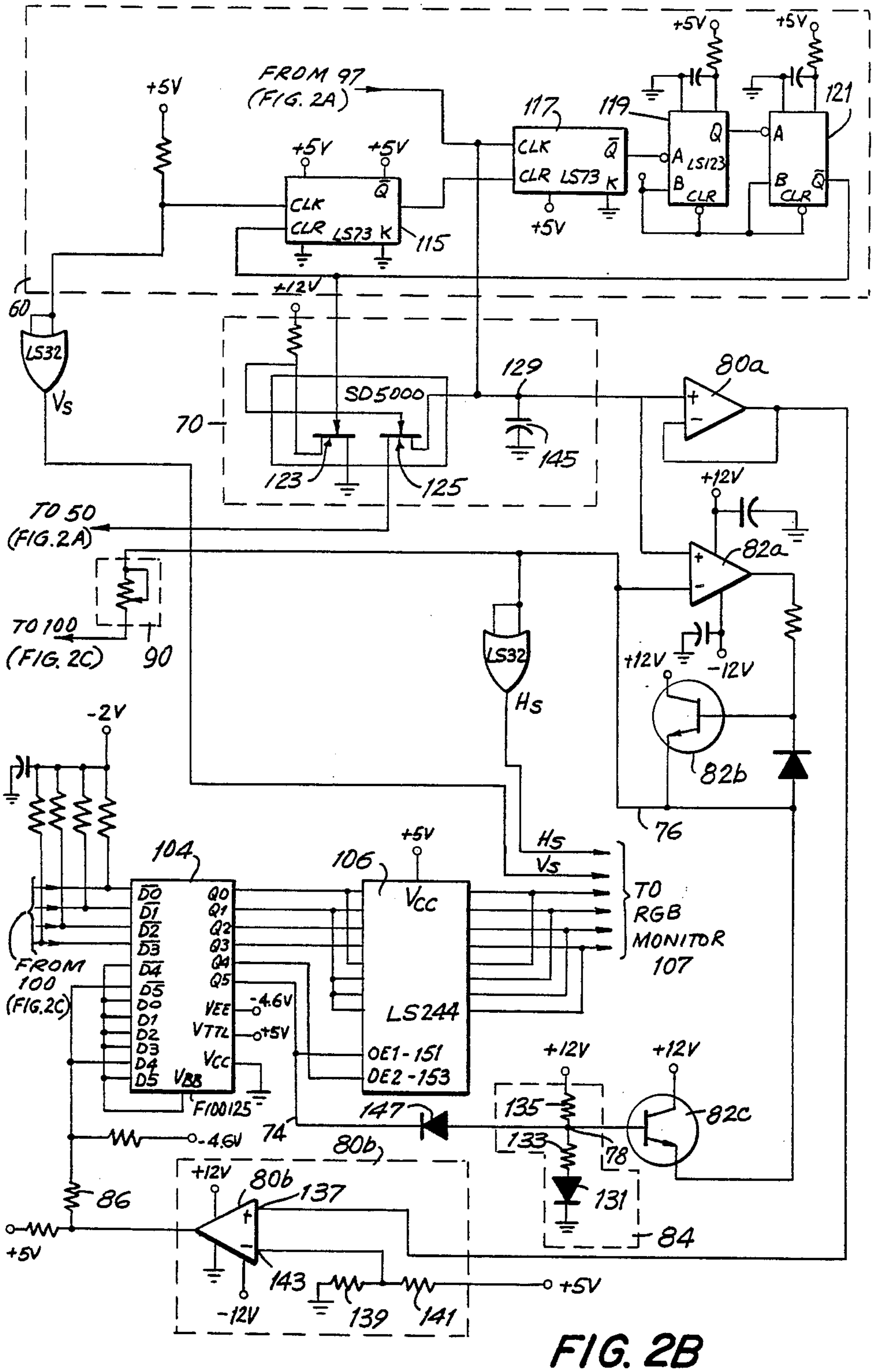
Figure 2C:
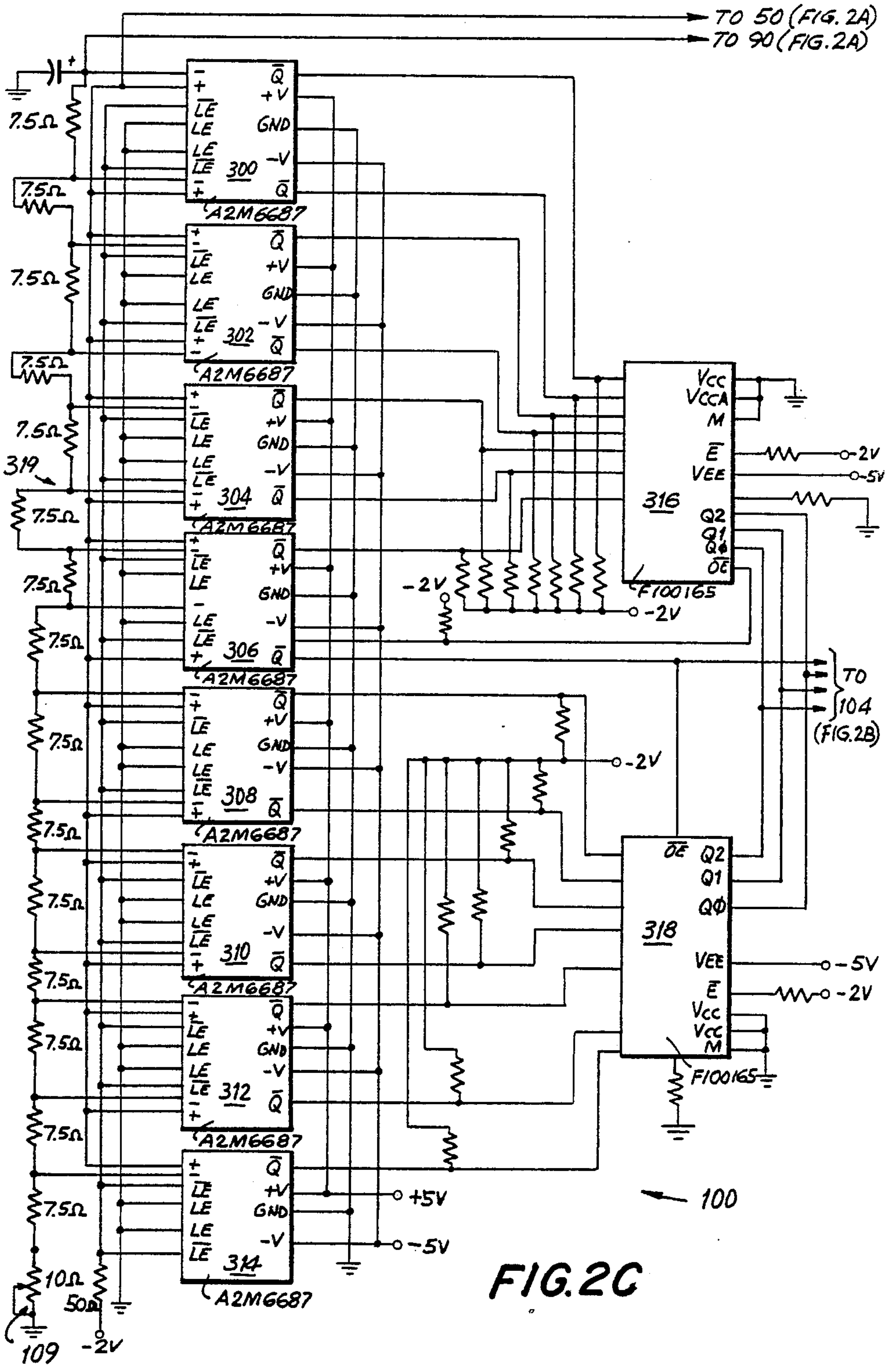

The output of clamp network 40 is preferably fed to a buffer 50 which preferably converts the high impedance output of network 40 into a low impedance DC restored signal input to an analog to digital flash converter 100, which is preferably a discrete flash converter, such as illustrated in FIG. 2C, employing comparators and conventional universal priority encoders, such as a Fairchild F100165, and which, as previously mentioned, receives the black and white adjust signal, such as from white adjust 90, to adjust the linearity of the converter 100. Flash converter 100, as shown and preferred in FIG. 2C, also preferably includes black level adjust network 109 which provides black level adjust which, as will be described in greater detail hereinafter, preferably adjusts the window for the resultant analog video signal in the analog to digital flash converter 100 by preferably moving the black reference $\frac{1}{2}$ LSB up while white level adjust preferably moves the white reference $\frac{1}{2}$ LSB down, thereby allowing adjustment for maximum linearity in the converter 100. The buffered DC restored signal output of buffer 50 is also preferably fed to a white sample and hold 70 which is controlled by the output of the white pulse gate 60. The output of the white sample and hold network 70 is a white reference signal which is preferably fed to a color/black and white detect network 80*a*, 80*b* as well as to a buffer switch 82, which also receives a fixed black and white reference voltage 84. The white reference output of the buffer switch 82 is fed to white adjust network 90 which, in turn, provides the white adjust signal to the flash converter 100 which takes the two reference signals −Vref and +Vref and provides the aforementioned four bit linear code output to a level translator 104. The four bit linear output of the level translator is fed to a black and white color switch 106 whose output is, in turn, fed to the RGB monitor 107 as the R,G,B and I signals, by way of example.

Referring now to FIG. 2 as a whole, the schematic diagram shown therein is essentially self explanatory; however, various aspects thereof shall be described in greater detail to enhance the understanding of the invention herein.

The differential line receiver and cable compensation and equalization network 10 is conventional and can be readily understood by reference to FIG. 2A without further explanation, with exemplary values for the various components of the network 10 being indicated in FIG. 2A. Suffice it to say that cable compensation and equalization is conventionally obtained via the R-C ladder network 11. With respect to the conventional type of adaptive sync stripper 20*a*, 20*b* preferably employed in the color decoder 200 of the present invention, a self-correcting feedback loop 41 comprising conventional voltage comparators 43 and 45, such as LM 339 COmparators, capacitors 47 and 49 and resistors 51, 53, and 55 is preferably employed. Resistor 53 and capacitor 47 comprise an integrator which integrates the sync signal to provide the duty cycle to comparator 45 which compares the duty cycle from the sync signal against the reference voltage which is applied to input 57 from a voltage divider network comprising resistors 59, 61 and 63, which is also connected to one input of another voltage comparator 65 whose output is Vs. Resistor 55 is the charge resistor for capacitor 49 in feedback loop 41. In comparing the duty cycle from sync with the reference voltage at the input 57, comparator 45 is preferably looking for the duty cycle to be greater than 20% which indicates that it is greater than the duty cycle of sync and, therefore, indicates that the signal is not sync. Comparator 43, on the other hand, strips sync from the video signal to provide sync to integrator 47-53, with the stripping preferably occurring at blanking and with a DC value such as 0 volts output across resistor 67 being equivalent to blanking. Feedback loop 41 also preferably includes a charge pump diode 69 to charge capacitor 49.

As shown and preferred in FIG. 2A, the sync tip is preferably DC restored to 0 volts essentially by diodes 71, 73, with R-C network 75-77 acting as a low pass filter to remove noise from the received video signal, and it is this signal, with the sync tip DC restored to 0 volts, which is applied to input 79 of comparator 43. A divide-by-two voltage divider network comprising resistors 67 and 81 is preferably provided and ensures that the voltage at point 83 is always 50% of sync regardless of the signal amplitude. Another voltage comparator 85 is preferably provided which, like comparator 43, strips sync from the video signal. As shown and preferred in FIG. 2, one input to comparator 85 is the voltage at point 83 while the other input is from low pass filter 75-77. The resultant sync stripped by comparator 85 is the broadcast composite sync used by the decoder 200, with an integrator comprising resistors 87 and 89 and capacitors 91 and 93 conventionally separating vertical sync Vs from the composite sync output of comparator 85. The vertical sync Vs, however, is normally serated and, therefore, the serations are preferably removed from the Vs output of comparator 65 by means of OR gate 95, whose other input is the broadcast composite sync output of comparator 85, with the OR gate 95 preferably removing the serations during the vertical interval. The horizontal sync signal Hs is provided through OR gate 95. Thus, the adaptive sync stripper 20*a*, 20*b* preferably tracks the signal level.

Before discussing clamp network 40 in greater detail, it should be noted that preferably differentiator 30 provides a predetermined pulse, such as 1.5 μsec on the back porch, which is used to create the clamp pulse for network 40, with differentiator 30 preferably comprising resistors 97, 99 and capacitor 101. The clamping network 40 preferably includes a pair of FET's 105,107 clamped to ground. FET 105 is a level shifter which preferably swings between a predetermined value, such as +12 v and ground. When the gate 105*g* of FET 105 goes negative during the back porch, FET 105 is turned off and FET 107 is turned on, putting the DC restoration voltage into capacitor 113 and clamping it at that value. Alternatively, when the gate 105*g* of FET 105 goes positive, FET 105 is turned on to ground which turns FET 107 off.

The black level for the flash converter 100 is provided by black adjust potentiometer 109 which is located at the −Vref input to flash converter 100 and adjusts the reference for the flash converter 100 by setting the black level. With respect to the determination of white level, this occurs as follows. As shown, and preferred in FIG. 2B, the white pulse gate 60 preferably comprises a pair of flip flops 115 and 117 and a pair of one shots 119 and 121, with flip-flops 115 and 117 preferably being JK flip flops, by way of example. On the falling edge of Vs, which is supplied as the clock pulse to flip flop 115, flip flop 115 is clocked. This preferably releases the clear on flip-flop 117 allowing it to be clocked at the next H which is the clock pulse to flip-flop 117. As was previously mentioned, Vs is slightly offset from Hs, such as by about 10 μsec, due to the integrator function. The next Hs to flip-flop 117 is the next line which, therefore, indicates that you are in the second horizontal scan line, which is where a full scale sample is located. When flip-flop 117 is on, this triggers one-shot 119 which provides a trigger pulse, such as preferably 1.5 μsec. by way of example, which puts it past the back porch. It should be noted that no sample and hold function is possible during the back porch since it is at 0 volts. One shot 119, in turn, triggers one shot 121 which generates a sample pulse for a predetermined sample interval, such as 28 μsec. by way of example, which sample pulse is preferably low during the sample time, with the sample pulse preferably releasing the clear on flip-flop 115 and resetting the flip-flop 115.

The white sample and hold network 70, as shown and preferred in FIG. 2, preferably comprises a pair of FETs 123-125 and a capacitor 145 which charges to provide a voltage which represents the white reference level for converter 100. When the gate 123*g* of FET 123 is positive, FET 123 is preferably turned on and FET 123 conducts to ground thereby turning FET 125 off. Alternatively, when the gate 123*g* of FET 123 goes negative, FET 123 is turned off and FET 125 turns on allowing capacitor 127 to charge, thereby creating a sample and hold which is current buffered by a conventional voltage follower 82*a*, with the sample voltage then present at point 129 representing the white reference level. As shown and preferred, the reference voltage is applied during the sample and hold time. The white reference, as was previously mentioned, is provided through a switch 82*b*, 82*c* which is preferably formed from an emitter follower transistor 82*b* and another transistor 82*c*, and the white adjust potentiometer 90, to the flash converter 100.

With respect to the black and white and color detect network 80*a*, 80*b*, this preferably includes buffer 80*a*, and detector 80*b*, with the conventional level translator 104 which preferably translates ECL to TTL, also technically being part of the detection function as will be described hereinafter. The fixed black and white reference voltage network 84 preferably comprises, by way of example, a diode 131 and a pair of resistors 133–135.

The operation of the decoder 200 in black and white or color detection is as follows. By way of example, a white sample is set at detecting a voltage value of approximately 1.5 volts, 0.5 volts is set as the black color detect level and below about 0.5 volts is set as the black detect level. Thus, if the voltage at input 137 to detector **80*b* is 1.5 volts in the above example, then color is detected and if it is less than 0.5 volts, black and white is detected. In this regard, buffer 80*a* works as a voltage follower from sample and hold network 70 to feed input 137 of detector 80*b* which is preferably a straight voltage comparator which compares the voltage produced by resistor voltage divider pair 139–141, connected to the other input 143, with the output of the sample and hold network 70**.

If black and white is the level detected by comparator **80*b*, then the white reference provided via path 76 preferably feeds the flash converter 100 upper reference from switch 82*b*–82*c*. If no color flag is detected, the sample on capacitor 145 is at 0 volts and the switch 82*b*–82*c* is at 0 volts. This being the case, the signal on path 74 is low creating a voltage at point 78, to the base of transistor 82*c* of switch 82*b*–82*c*, which is the black and white reference. Transistor 82*c* then acts as a voltage follower for the white reference. When transistor 82*b* is on, transistor 82*c* preferably blocks the signal from going through it, with the reverse being true when transistor 82*c*** is on.

If, on the other hand, color is the level detected by comparator **80*b*, then diode 147 goes high which turns off transistor 82*c*. Voltage follower 82*a* and emitter follower 82*b* now represent the white reference voltage. Transistor 82*c* preferably blocks this voltage and the output of voltage follower 82*a*—emitter follower 82*b* is applied to path 76 as the white reference which is applied to the upper reference of flash converter 100 instead of the fixed voltage black and white reference output from network 84. It should be noted that if a color flag were present, then there would be approximately 1.5 volts in capacitor 145 and color would be detected. Thus, in the instance of reception of a multilevel grey scale digitally encoded color video signal over cable 202, a dynamically sampled white reference signal derived from the received sync information is passed to converter 100, while in the instance of reception of a conventional black and white video signal over cable 202, this dynamically sampled white reference signal is replaced by the fixed black and white reference signal from source 84**.

The black and white/color switch 106, which preferably provides the standard TTL R,G,B,I signals employed in the conventional RGB monitor 107, operates as follows. The switch 106 is preferably a conventional tristate buffer with two enable inputs 151, 153, such as an LS 244, in which when one enable is on the other is off and vice versa. Assuming for purposes of explanation, that −Vref. is always equal to 0, when enable input 151 is on, preferably the four conventional RGB color bits, R,G,B, and I, are passed directly through switch 106, and when enable input 153 is on, preferably a mapping of the transmitted conventional black and white video signal occurs. In mapping the transmitted conventional black and white video signal, preferably the most significant bit or MSB represents the half point in the analog domain, the next bit or NSB represents the quarter point in the analog domain, and the two least significant bits are ignored since these bits provide too fine a resolution to have an impact on the coarse mapping used for black and white. When black and white switch 106 is in the color mode, the bits flow straight through switch 106, with I being the most significant bit and B or blue being the least significant bit. In this regard, it should be noted that B or blue has the lowest perceived luminance level, R or red is the next highest, then G or green, and I or intensity is the brightest of all three. When black and white is detected by switch 106, the bits are preferably shifted to build windows that will result in four levels comprising two shades of grey, black, and white, with the most significant bit coming on at the 50% level, halfway up the scale, and the other bits come on at various other points as will be explained hereinafter. The most significant bit coming on maps to the I bit going out from switch 106; i.e., when the 50% level is achieved, you get an intensity out. In this regard, a code R,G,B, with I, that is with all four of the output bits of switch 106 on, preferably represents full intensity white which is achieved whenever 75% of +Vref is exceeded. When in the range of 50%–75% of Vref., an RGB code is preferably put out which represents one of the two shades of grey, with just the I output bit of switch 106 on. When in the range of 25%–50% of Vref, an RGB code is preferably put out which represents the other of the two shades of grey, with just the R,G,B, output bits on and the I output bit off of switch 106. Finally, when in the range of 0–25%, no R,G,B, or I output bit of switch 106 is put out and it represents black. Thus, the two most significant bits provided to switch 106 from level translator 104, and flash converter 100 are the control bits for switch 106 for providing a four level signal. When these two bits are on, then 75% of the analog voltage or full scale white is preferably provided; when either one of these bits is on and the other off, it is preferably one of two shades of grey, and when both of these bits are off it is preferably black. Thus 1-1 preferably represents full white and translates to an output of 1-1-1-1, 1-0 preferably represents one shade of grey such as light grey and translates to an output of 1-0-0-0, 0-1 preferably represents a second shade of grey, or low intensity white or dark grey and translates to an output of 0-1-1-1, and 0-0 preferably represents black and translates to an output of 0-0-0-0.

In order to more fully understand the operation of the presently preferred discrete A/D flash converter 100 employed in the present invention, it shall be briefly described with reference to FIG. 2C. As shown and preferred in FIG. 2C, eight conventional dual comparators 300, 302, 304, 306, 308, 310, 312 and 314, respectively, such as AM 6687 dual comparators, are provided for the 16 level grey scale code, with each one of the 16 comparator stages preferably being provided with an input voltage 1/16 higher than the input voltage of the immediately preceding comparator stage through a ladder network 319. The comparators 300–314, inclusive respectively, preferably feed a pair of conventional universal priority encoders 316, 318 such as the aforementioned Fairchild F100165 Universal Priority Encoders, which provide a 4 bit linear code output to the level translator 104. In the example of FIG. 2C, the highest order in the ladder network 319 is preferably comparator 300 and the lowest order is comparator 314. As the analog input voltage +Vref and −Vref through the ladder network 319 goes above the ladder network 319 input to the comparators 302–314, inclusive, Q preferably goes high, thereby creating a 16 level thermometer code which is fed to the priority encoder network 316, 318. As shown and preferred in FIG. 2C, the priority encoders 316, 318 only provide three of the four bits of the 4 bit linear code output with the fourth bit preferably coming from the eighth comparator stage, which, in the above example, is the lower half of comparator 306. This stage determines which priority encoder 316 or 318 is active, with an output enable preferably being provided to encoder 318 if you are in the lower half of the 16 level thermometer code and with an output enable, instead, preferably being provided to encoder 316 if you are in the upper half of the 16 level thermometer code. Of course, if desired, a clocked A/D flash converter, such as a Siemens SDA8018 driven by a conventional two phase clock could be substituted for the presently preferred discrete flash converter 100 without departing from the spirit and scope of the present invention.

Consequently, by employing the decoder 200 of the present invention, a video signal transmitted over a single coaxial cable in the form of a conventional black and white video signal or a digitally encoded 16 level grey code color video signal may be converted to the four conventional RGB bits, without loss of bandwidth, and used to drive a conventional RGB monitor irrespective of whether the input is a digitally encoded color video signal or a conventional black and white video signal. This is accomplished while enabling conventional composite video signals to be converted to TTL format to drive a standard RGB monitor, such as normally employed with an IBM PC.

What is claimed is:

1. A decoder apparatus for providing an R,G,B,I video drive signal from a conventional black and white video signal or a digitally encoded multilevel grey scale color video input signal comprising sync information and displayable information, said decoder comprising means for receiving said black and white and digitally encoded multilevel grey scale color video input signal and restoring it into separate DC restored sync and black and white or color video display information;

means for selectively providing a fixed white reference level signal or a dynamically sampled white reference level signal; and means operatively connected to said white reference level signal providing means and to said signal restoring means for converting said video display information into an R,G,B,I TTL type of video drive signal, said converting means comprising means for detecting whether said received video display information is digitally encoded color or conventional black and white based on a predetermined signal level decoded from said received video input signal, and means for mapping said restored video display information and for providing a multibit code therefrom based on said selectively provided white reference level signal, said mapping means comprising means for mapping said detected conventional black and white video signal for providing said R,G,B,I TTL type of video drive signal based thereon, said mapped black and white video signal comprising a pair of bits logically representing full intensity white, grey, low intensity white or black based on a predetermined percentage of said fixed white reference level signal, said mapping means further comprising means for mapping said restored video display information based on said dynamically sampled white reference level signal for said detected digitally encoded multilevel grey scale color video signal, said mapped color video signal comprising a plurality of bit representing a plurality of different possible color combinations of R,G,B and I; whereby a composite video signal may be decoded to provide a TTL format R,G,B,I type of video drive signal without loss of bandwidth.

2. A decoder in accordance with claim 1 wherein said digitally encoded grey scale color video signal comprises a sixteen level code for providing sixteen possible color combinations of R,G,B, and I.

3. A decoder in accordance with claim 2 wherein said mapping means comprises means for mapping said conventional black and white video signal as a 1-1 logic condition of said pair of bits and providing a R,G,B,I TTL type of video drive signal code corresponding to said full intensity white based thereon, a 0-0 logic condition of said pair of bits and providing an R,G,B,I TTL type of video drive signal corresponding to said black based thereon, a 1-0 logic condition of said pair of bits and providing an R,G,B,I TTL type of video drive signal corresponding to said grey, or a 0-1 logic condition of said pair of bits and providing an R,G,B,I TTL type of video drive signal corresponding to said low intensity white based thereon.

4. A decoder in accordance with claim 3 wherein said provided pair of bits represent the two most significant bits of a provided four bit code.

5. A decoder in accordance with claim 4 wherein the most significant bit of said provided pair of bits represents the half point in the analog domain for said white reference signal and said selectively provided next most significant bit represents the quarter point in the analog domain for said selectively provided white reference signal.

6. A decoder in accordance with claim 5 wherein said R,G,B,I TTL type of video drive signal providing means comprises means for providing said R,G,B,I TTL type of video drive signal corresponding to said full intensity white when said encoded pair of bits represents 75% of said fixed white reference signal level, corresponding to said grey when said encoded pair of bits represents a signal level within 50%–75% of said white reference signal level, corresponding to said low intensity white when said encoded pair of bits represents a signal level within 25%–50% of said fixed white reference signal level, and corresponding to black and representing no R,G,B,I when said encoded pair of bits represents a signal level within 0%–25% of said fixed white reference signal level.

7. A decoder in accordance with claim 1 wherein said means for selectively providing a white reference level signal comprises means for providing a fixed white reference signal to said converting means as said reference voltage when said black and white display information is detected as having been received, said converting means providing said R,G,B,I TTL type of video drive signals from said black and white video display information.

8. A decoder in accordance with claim 1 wherein said mapping means comprises means for mapping said detected conventional black and white video signal as a 1-1 logic condition of said pair of bits and providing a R,G,B,I TTL type of video drive signal code corresponding to said full intensity white based thereon, a 0-0 logic condition of said pair of bits and providing an R,G,B,I TTL type of video drive signal corresponding to said black based thereon, a 1-0 logic condition of said pair of bits and providing an R,G,B,I TTL type of video drive signal corresponding to said grey, or a 0-1 logic condition of said pair of bits and providing an R,G,B,I TTL type of video drive signal corresponding to said low intensity white based thereon.

9. A decoder in accordance with claim 8 wherein said pair of bits represent the two most significant bits of a four bit code.

10. A decoder in accordance with claim 9 wherein the most significant bit of said pair of bits represents the half point in the analog domain for said fixed white reference signal and said next most significant bit represents the quarter point in the analog domain for said fixed white reference signal.

11. A decoder in accordance with claim 10 wherein said R,G,B,I TTL type of video drive signal providing means comprises means for providing said R,G,B,I TTL type of video drive signal corresponding to said full intensity white when said encoded pair of bits represents 75% of said white reference signal level, corresponding to said grey when said encoded pair of bits represents a signal level within 50%–75% of said white reference signal level, corresponding to said low intensity white when said encoded pair of bits represents a signal level within 25%–50% of said fixed white reference signal level, and corresponding to black and representing no R,G,B,I when said encoded pair of bits represents a signal level within 0%–25% of said white reference signal level.

12. A decoder in accordance with claim 1 wherein said R,G,B,I TTL type of video drive signal providing means comprises means for providing said R,G,B,I TTL type of video drive signal corresponding to said full intensity white when said encoded pair of bits represents 75% of said white reference signal level, corresponding to said grey when said encoded pair of bits represents a signal level within 50%–75% of said white reference signal level, corresponding to said low intensity white when said encoded pair of bits represents a signal level within 25%–50% of said fixed white reference signal level, and corresponding to black and representing no R,G,B,I when said encoded pair of bits represents a signal level within 0%–25% of said fixed white reference signal level.

13. A decoder in accordance with claim 1 wherein the most significant bit of said pair of bits represents the half point in the analog domain for said selectively provided white reference signal and said next most significant bit represents the quarter point in the analog domain for said selectively provided white reference signal.

14. A decoder in accordance with claim 13 wherein said R,G,B,I TTL type of video drive signal providing means comprises means for providing said R,G,B,I TTL type of video drive signal corresponding to said full intensity white when said encoded pair of bits represents 75% of said fixed white reference signal level, corresponding to said grey when said encoded pair of bits represents a signal level within 50%–75% of said white reference signal level, corresponding to said low intensity white when said encoded pair of bits represents a signal level within 25%–50% of said fixed white reference signal level, and corresponding to black and representing no R,G,B,I when said encoded pair of bits represents a signal level within 0%–25% of said fixed white reference signal level.

15. A decoder in accordance with claim 1 wherein said pair of bits represent the two most significant bits of a four bit code.

16. A decoder in accordance with claim 1 wherein said means for selectively providing said white reference level signal comprises means for sampling said restored sync information for dynamically providing said white reference level signal therefrom for said detected color video signal.

17. A decoder in accordance with claim 16 wherein said means for selectively providing said white reference level signal comprises means for providing a fixed white reference signal to said converting means as said reference voltage in place of said dynamically provided white reference level signal when said black and white display information is detected as having been received, said converting means providing said R,G,B,I TTL type of video drive signals from said black and white video display information.

18. A decoder in accordance with claim 16 wherein said detected digitally encoded grey scale color video signal comprises a sixteen level code for providing sixteen possible color combinations of R,G,B, and I.

19. A decoder in accordance with claim 16 wherein said mapping means comprises means for mapping said dectected conventional black and white signal as a 1-1 logic condition of said pair of bits and providing a R,G,B,I TTL type of video drive signal code corresponding to said full intensity white based thereon, a 0-0 logic condition of said pair of bits and providing an R,G,B,I TTL type of video drive signal corresponding to said black based thereon, a 1-0 logic condition of said pair of bits and providing an R,G,B,I TTL type of video drive signal corresponding to said grey, or a 0-1 logic condition of said pair of bits and providing an R,G,B,I TTL type of video drive signal corresponding to said low intensity white based thereon.

20. A decoder in accordance with claim 19 wherein said pair of bits represent the two most significant bits of a four bit code.

21. A decoder in accordance with claim 20 wherein the most significant bit of said pair of bits represents the half point in the analog domain for said fixed white reference signal and said next most significant bit represents the quarter point in the analog domain for said fixed white reference signal.

22. A decoder in accordance with claim 21 wherein said R,G,B,I TTL type of video drive signal providing means comprises means for providing said R,G,B,I TTL type of video drive signal corresponding to said full intensity white when said encoded pair of bits represents 75% of said fixed white reference signal level, corresponding to said grey when said encoded pair of bits represents a signal level within 50%–75% of said fixed white reference signal level, corresponding to said low intensity white when said encoded pair of bits represents a signal level within 25%–50% of said fixed white reference signal level, and corresponding to black and representing no R,G,B,I when said encoded pair of bits represents a signal level within 0%–25% of said fixed white reference signal level.

23. A decoder in accordance with claim 16 wherein the most significant bit of said pair of bits represents the half point in the analog domain for said dynamically sampled white reference signal and said next most significant bit represents the quarter point in the analog domain for said dynamically sampled white reference signal.

24. A decoder in accordance with claim 23 wherein said R,G,B,I TTL type of video drive signal providing means comprises means for providing said R,G,B,I TTL type of video drive signal corresponding to said full intensity white when said encoded pair of bits represents 75% of said dynamically sampled white reference signal level, corresponding to said grey when said encoded pair of bits represents a signal level within 50%-75% of said dynamically sampled white reference signal level, corresponding to said low intensity white when said encoded pair of bits represents a signal level within 25%-50% of said dynamically sampled white reference signal level, and corresponding to black and representing no R,G,B, when said encoded pair of bits represents a signal level within 0%-25% of said dynamically sampled white reference signal level.

25. A decoder in accordance with claim 16 wherein said multilevel digitally encoded color video signal is obtained from an initial R,G,B,I color video signal, said multilevel digitally encoded color video signal being based on perceived luminance levels in said initial R,G,B,I color video signal, said converting means comprising means for recovering said initial R,G,B,I color video signal from said multilevel digitally encoded color video signal.

26. A decoder in accordance with claim 1 wherein said multilevel digitally encoded color video signal is obtained from an initial R,G,B,I color video signal, said multilevel digitally encoded color video signal being based on perceived luminance levels in said initial R,G,B,I color video signal, said converting means comprising means for recovering said initial R,G,B,I color video signal from said multilevel digitally encoded color video signal.

27. A decoder in accordance with claim 26 wherein said digitally encoded grey scale color video signal comprises a sixteen level code for providing sixteen possible color combinations of R,G,B, and I.

* * * * *